Sept. 15, 1942.   L. GESS   2,295,728
MEASURING INSTRUMENT
Filed Feb. 21, 1940   2 Sheets—Sheet 1

INVENTOR
LOUIS GESS
BY
E.B. Spangenberg
ATTORNEY

Sept. 15, 1942.　　　　L. GESS　　　　2,295,728
MEASURING INSTRUMENT
Filed Feb. 21, 1940　　　　2 Sheets-Sheet 2

INVENTOR
LOUIS GESS
BY C.B. Spangenberg
ATTORNEY

Patented Sept. 15, 1942

2,295,728

UNITED STATES PATENT OFFICE 2,295,728

MEASURING INSTRUMENT

Louis Gess, Jenkintown, Pa., assignor to The Brown Instrument Company, Philadelphia, Pa., a corporation of Pennsylvania Application February 21, 1940, Serial No. 320,001

20 Claims. (Cl. 230—4)

The present invention relates to instruments which control the weight of air flowing through a duct and more particularly to a flow controller which is compensated for changes in atmospheric conditions.

Ordinarily flow controllers regulate the flow of the fluid in such a manner that a constant volume of said fluid is delivered to the point of use. In some cases, however, it is desired to obtain a constant weight per unit time instead of volume. In such a case physical changes in the fluid such as temperature, pressure and humidity of the fluid must be taken into consideration. In order to obtain such results a constant volume controller must be adjusted in some manner as the temperature, pressure or humidity of the fluid changes to compensate for said changes.

It is an object of my invention to provide an instrument that will control the flow of a gas such as air to deliver a constant weight at the point of use. Such instrument is provided with novel compensating means which will accurately and simply cause an adjustment thereof in response to physical changes of the gas.

It is a further object of the invention to provide a control instrument which is readily adjusted to control the flow of gas to any value within its range and one in which physical changes in the gas are automatically compensated for to keep the delivered weight of the gas constant.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
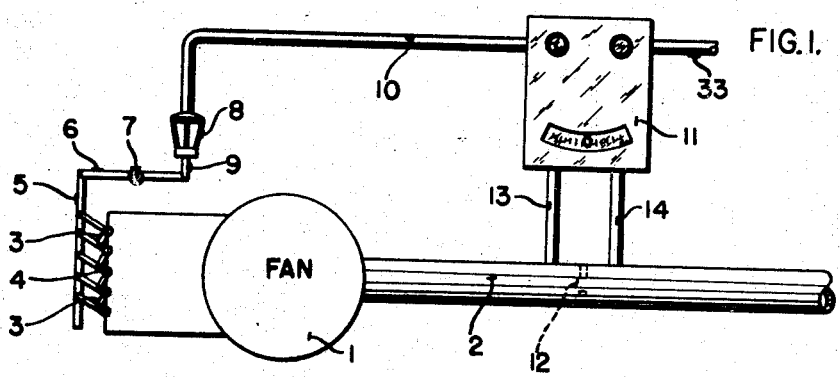
Fig. 1 is a diagrammatic view of a system using my novel instrument.

Referring first to Figure 1, there is shown a constant speed fan 1 which is used to blow air through a pipe 2 to the point of use. The volume of air supplied by the fan is adjusted by changing the position of a set of louvers 3 on the entrance side of the fan, which louvers are pivoted at 4 to the fan casing. The louvers are opened and closed by vertical movement of a rod 5 which is shifted by a lever 6, pivoted at 7, and supplied with power by a pneumatic motor 8.

The motor 8 is provided with a stem 9 that is moved up and down in response to air pressure applied to a diaphragm forming part thereof, the air being supplied through a pipe 10. The air pressure is regulated in accordance with the flow of air through the pipe 2 and in accordance with atmospheric conditions by a controller 11, the details of which will now be described.

Figure 5:
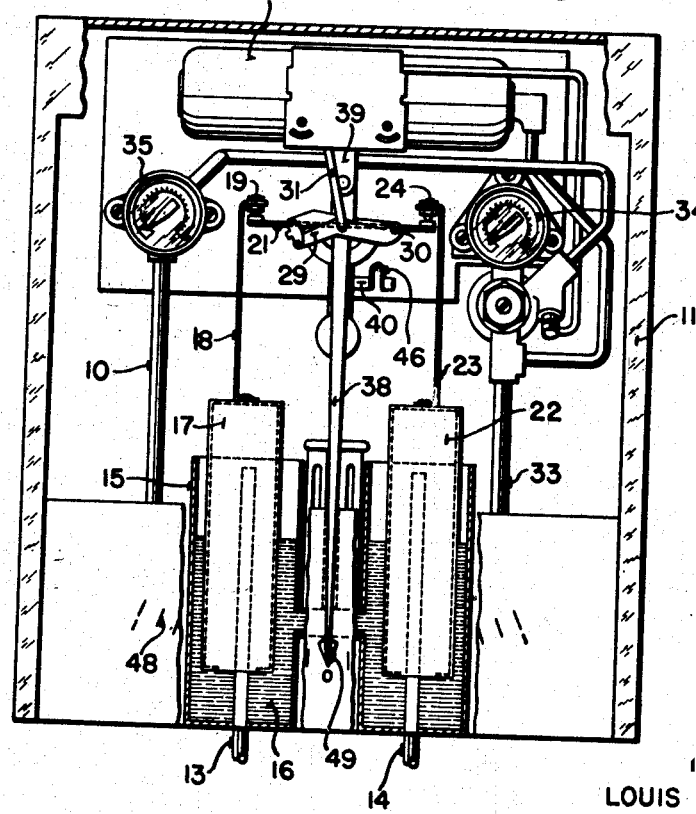
Fig. 5 is a front view of the control instrument.

Located within the pipe 2 is an orifice 12 upon opposite sides of which are located pressure taps 13 and 14 by which the differential pressure across the orifice and therefore the flow in the pipe 2 may be measured. The taps 13 and 14 lead to the interior of the instrument 11 and extend up through a tank 15 (Fig. 5) that contains a sealing liquid 16 of some suitable material such as thin oil. The pressure tap or pipe 13 extends into the tank 15 above the level of the sealing liquid and has its upper end covered by a bell 17. The bell is supported by a link 18 whose upper bent over end has attached to it a downwardly extending pivot pin 19 that is received in a bearing socket 20 on one end of a lever 21. In a like manner the upper end of the pipe 14 is covered by a bell 22 that is supported by a link 23 which is in turn supported by a pin and socket bearing 24 on the other end of lever 21.

As the flow through pipe 2 changes, the pressure differential in the pipes 13 and 14 will change to cause a tilting movement of the lever 21 around bearings 25 that are mounted on a bracket 26 attached to the instrument casing. Adjustably attached to the lever 21 is an arm 27 that is connected by a link 28 to a lever 29 pivoted at 30. As the lever 21 moves due to changes in flow in pipe 2 the lever 29 is moved around its pivot to raise and lower a link 31 pivoted thereto. Movement of link 31 serves to regulate the air pressure applied by an air control unit 32 through the pipe 10 to motor 8. This air control unit 32 may be of any well known form but preferably is and is shown as an Air-O-Line controller manufactured and sold by the Brown Instrument Company. The specific type of air control unit shown forms no part of the present invention except in combination with other details to be described, but is shown and claimed in Patent 2,125,081, issued to Coleman B. Moore.

Air is supplied to the control unit 32 through an air line at 33 at a suitably regulated pressure as shown by a gauge 34. As the flow changes, movement of link 31 will so adjust the control unit that air under a pressure proportional to the value of the flow, and indicated on gauge 35, will be supplied through pipe 10 to the motor 8. As air pressure on the diaphragm of motor 8 is varied the opening of the louvers 3 will be varied to adjust the air intake for the fan and thereby the flow in pipe 2. This arrangement will insure the supply of a constant volume of air through the pipe 2 for any given atmospheric condition.

In order to change the control point of the instrument or the volume of air supplied for any given atmospheric condition, and in order to compensate for any changes in atmospheric conditions to insure the supply of a constant weight of air through the pipe 2, the following arrangement is used.

Figure 2:
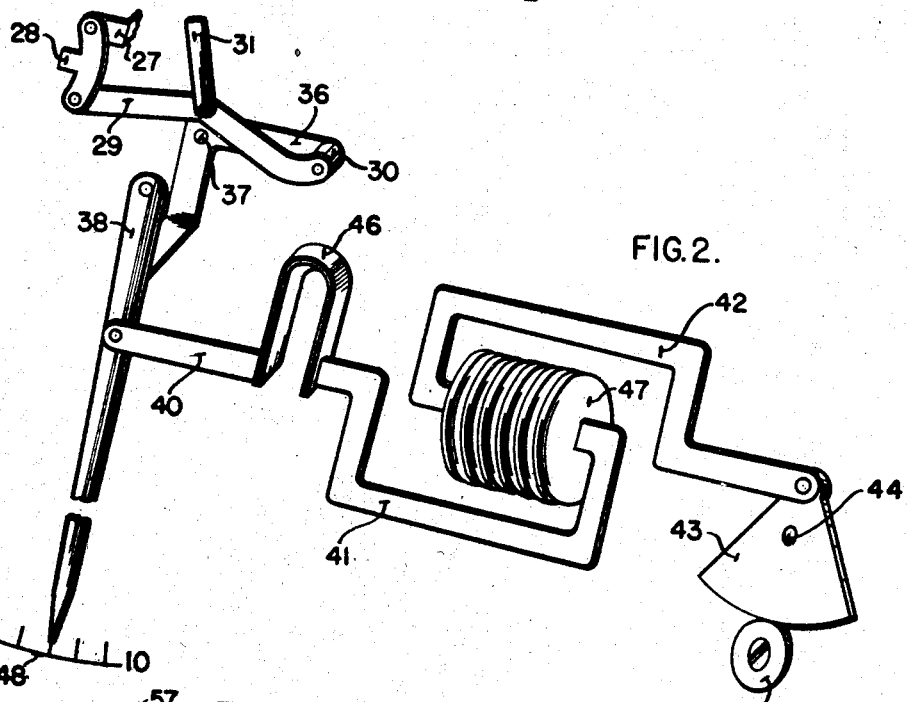
Fig. 2 is a view showing one form of compensating mechanism.

The normally stationary fulcrum point 30 of the lever 29 is mounted on a lever 36 that is pivoted at 37 on the bracket 26. The other arm of lever 36 extends forwardly, as is shown in Figure 2, and is attached to an indicator arm 38 that is pivoted at its upper end to a depending member 39 which extends from the air control unit 32. The indicator arm 38 is moved manually to shift pivot 30 to change the control point of the instrument and is moved automatically to compensate for changes in atmospheric conditions.

As is well known the flow of a fluid through a conduit varies directly as the square root of the absolute pressure and inversely as the square root of the absolute temperature. Therefore, in order to maintain the weight of the air delivered by fan 1 constant, provision must be made to reduce the volume of flow as the pressure increases and to increase the volume of flow as the temperature increases. To this end, the adjusting link for indicator 38 is provided with a temperature responsive member and with a pressure responsive member.

The adjusting member for indicator 38 and pivot point 30 comprises a link formed of parts 40, 41 and 42, the former of which is connected to the indicating arm and the latter of which is connected to one arm of a segment shaped lever 43. The latter is pivoted at 44 and is formed on its lower edge with gear teeth that mesh with a pinion 45 which may be rotated either by hand or by a screw driver inserted in a kerf provided thereon. Between the sections 40 and 41 is located a U-shaped bimetallic member 46 which upon an increase in temperature moves its ends together to shorten the total length of the adjusting link. Such a movement will raise the control point of the instrument sufficiently to compensate for the increase in temperature. Located between the link sections 41 and 42 is an evacuated bellows 47 which will contract and expand upon increases and decreases in atmospheric pressure. If the atmospheric pressure increases the bellows will be contracted to increase the length of the adjusting link and decrease the control point of the instrument.

A scale 48 is provided with which the end of pointer 38 cooperates to indicate the control point for which the instrument is set. The lever 21 is also provided with an indicating arm 49 that cooperates with scale 48 to indicate the value of the flow through pipe 2.

From the above description it will be seen that as atmospheric temperature and pressure changes occur the control point of the instrument will be altered accordingly. Since the instrument controls the opening of louvers 3 to regulate the amount of air admitted to the fan 1 the delivery of the air from the fan will be adjusted in accordance therewith and a constant weight of air per unit time will be forced through the pipe 2.

Instead of adjusting the control point of the instrument an arrangement may be used to obtain the same results by leaving the control point constant and adjusting the pressure applied under the bell 17 in accordance with changes in atmospheric conditions.

It is a well known fact that a differential meter will read low if there is a leak in the high pressure line connecting with the orifice tap. It is also known that if the amount of leakage is constant the meter can be calibrated to read correctly. On the basis of these facts the flow of a fluid may be compensated for by having adjustable leaks in said high-pressure or up-stream line to the meter, the leaks being adjusted in accordance with changes in atmospheric conditions.

Figure 3:
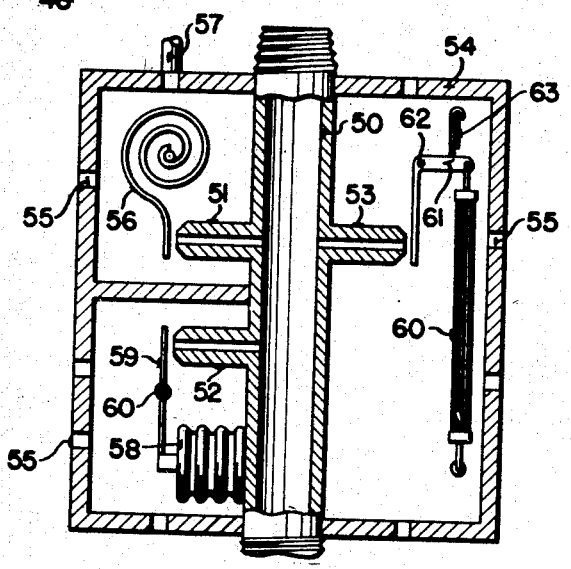
Fig. 3 is a view showing a modified form of compensating mechanism.
Figure 4:
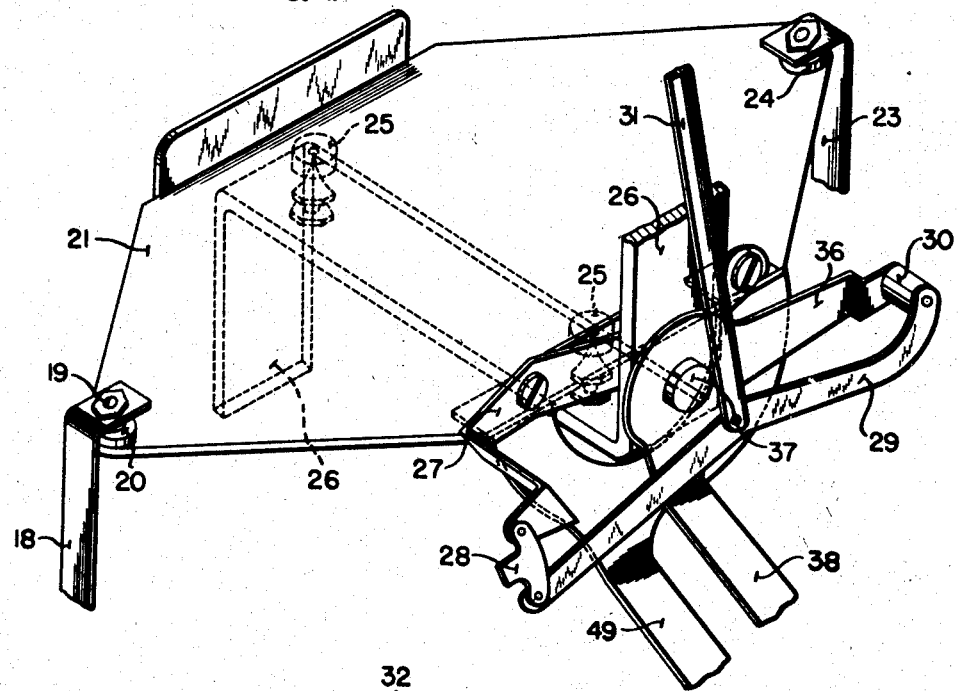
Fig. 4 is a view of the lever arrangement in my control mechanism.

A device to accomplish this type of compensation is shown in Figure 3 and consists of a short section of pipe 50 to be inserted in the high pressure line 13. The pipe 50 is provided with these nozzles or ports 51, 52 and 53 through which a predetermined leakage may occur. The entire section of pipe is enclosed by a boxlike structure 54 that is provided with suitable openings 55 to permit a circulation of air through the sections of the box.

Since an increase in temperature will cause a differential fluid meter to read low the indicator position should be higher in order to read the correct flow based on the original operating conditions. Therefore, there is located in one section of the enclosure 54 a bimetallic spiral 56, that will move in such a direction that its end will restrict the flow through port 51 upon an increase in temperature to which the spiral is subjected. Due to the openings 55 in enclosure this temperature is that of the atmosphere. If, however, the temperature of the gas discharged from the fan 1 is not the same as that of the atmosphere a separate connection 57 from the pipe 2 may exhaust into the compartment where the spiral 56 is located so that the temperature of the spiral is the same as that of the gas in the pipe 2.

An increase in barometric pressure will cause a differential fluid meter to read high, so the pen postion should be lower in order for the meter to indicate the correct flow based on the original operating conditions. To this end an evacuated bellows 57 is located in one of the compartments of the structure 54. Expansion and contraction of the bellows 58 due to atmospheric pressure changes moves a valve member 59, pivoted at 60, with respect to the port 52 to vary the flow therethrough and the pressure under bell 17. As atmospheric pressure increases the bellows 58 will contract and move valve 59 away from port 52 to permit a greater leakage through the port to cause the indicator 49 to move to its proper position for the flow at the original conditions for which the instrument was set.

The flow through a line will vary directly as the square root of the amount of moisture in a gas. Therefore, in order to compensate for variations in the relative humidity of the atmosphere a humidity responsive member is used to vary the leakage through the port 53. To this end an hygrometric element 60, which expands upon an increase in humidity, is anchored at its lower end and is attached at its upper end to one arm of a bell-crank 61, pivoted at 62 and having its other arm act as a valve for the port 53. The bell-crank is biased in a counter-clockwise direction by a spring 63. As the relative humidity of the atmosphere increases the hygrometric member 60 will expand to permit spring 63 to move the lower arm of the bell-crank 61 away from the port 53 so that more air can escape from the port. This compensates the position of pointer 49 for the changed condition.

Since as the position of the indicator is adjusted the link 31 will also be shifted, the air controller mechanism will be actuated to vary the pressure applied to the diaphragm of motor 8. This in turn will position louvers 3 so that the correct weight of air will be forced through the pipe 2.

The pressure and humidity compensating means may also be made responsive to the conditions of the gas in pipe 2 instead of to the atmosphere by merely removing the partitions in the structure 54 so that the measuring elements for the pressure and humidity will be exposed to the gas entering through the pipe 57, as well as the temperature measuring element 56.

From the above description it will be seen that I have provided an instrument which will accurately control the weight of air or other gas as it is forced through a pipe. The instrument is automatically compensated for variations in the conditions of the gas in a simple inexpensive and accurate manner.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In an instrument for controlling the flow of a fluid through a pipe, means to measure the flow of said fluid, means operated thereby to control the flow of fluid, means to adjust the point at which said control means will control said flow, and means to vary said adjusting means in accordance with changes in atmospheric conditions.

2. In a control instrument, the combination with means to measure the flow of a fluid through a pipe, means to regulate the amount of said flow operated by said measuring means, adjusting means to regulate the normal amount of flow which the regulating means tends to maintain, a link to move said adjusting means and means to vary the length of said link upon changes in atmospheric conditions.

3. In a measuring and control instrument the combination with means to measure the flow of a fluid through a conduit, mechanism operated by said measuring means to control said flow, means to adjust said mechanism whereby different values of flow will be maintained in said conduit, and devices forming part of said adjusting mechanism to automatically regulate said adjusting means in response to physical changes in atmospheric conditions.

4. In a flow control system, a conduit through which a fluid is adapted to flow, an instrument to measure the flow through said conduit, means to force fluid through said conduit, means to control the supply of fluid to said fluid forcing means operated by said flow measuring means, and means to automatically adjust said control means in response to ambient conditions of the supply of fluid to said fluid forcing means.

5. In a measuring and control system, means to measure the flow of fluid through a conduit, means actuated by said measuring means to adjust said control means to tend to maintain a constant volume of fluid flowing through said conduit, and means to adjust said control means to compensate for physical changes in atmospheric conditions whereby the controller will maintain a constant weight flow through said conduit.

6. An instrument for controlling the flow of a fluid through a conduit to a constant weight, comprising means to measure the volume of the flow of said fluid, means operated by said measuring means to control the flow and means to compensate said control means for changes in pressure and temperature of said fluid comprising a shiftable member to adjust said control means and a temperature responsive element and a pressure responsive element operatively connected with said shiftable member.

7. In a measuring and control system the combination with a pipe the flow through which is to be measured and controlled, a differential creating device in said pipe, a flow controller to measure and control the flow through said pipe in response to the differential across said device, pressure taps from said device to said flow controller, a leak in one of said taps and means to vary the opening of said leak in response to variations in an ambient atmospheric condition.

8. An instrument for controlling the weight of a fluid passing through a conduit comprising a differential pressure measuring device to measure the volume of the flow through said conduit, a control mechanism operated by said device, pressure pipes leading from said conduit to said device, and means for varying the differential pressure applied to said device in response to changes in atmospheric conditions to compensate for volume changes.

9. In a differential pressure measuring device means to measure a differential pressure, means to transmit said differential pressure to said device, and means to vary said differential in response to changes in temperature, pressure and humidity of the atmosphere.

10. In a flow controller the combination with control means to control the flow of a fluid through a conduit, differential pressure measuring means to operate said control means to tend to maintain a constant volume of flow, means to compensate for ambient condition changes in the flowing fluid comprising means to vary the differential pressure applied to said measuring means in response to changes in the flowing fluid, whereby a constant weight of the flowing fluid will be maintained.

11. In an instrument to measure and control the flow of a fluid through a conduit, the combination of a mechanism responsive to a differential pressure created by the flow of the fluid, air control apparatus adapted to adjust instrumentalities to regulate the flow of the fluid operated by the said responsive mechanism, said mechanism including means responsive to temperature and pressure of the atmosphere adjacent the conduit through which the fluid is flowing to correspondingly adjust the responsive mechanism.

12. In a measuring and controlling instrument for controlling the flow of fluid through a pipe, means to measure the flow of said fluid, means operated thereby to control the flow of fluid, means to adjust the point at which said control means will control said flow and means to operate said adjusting means in accordance with changes in the temperature and changes in the pressure of the atmosphere surrounding said instrument.

13. In a control instrument, the combination with means to measure the flow of fluid through a pipe, means to regulate the amount of said flow operated by said measuring means, adjusting means to regulate the normal amount of flow that the regulating means tends to maintain, a link to move said adjusting means and means to vary the length of said link responsive to changes in temperature and changes in pressure of the atmosphere surrounding the instrument.

14. In a measuring and control instrument for controlling the weight of air flow through a conduit, the combination with measuring means, control means actuated thereby, means to adjust the value at which the control means will tend to maintain the weight of the air, and a temperature responsive element and a pressure responsive element forming part of said adjusting means whereby changes in temperature and pressure adjacent said adjusting means will alter the setting of said adjusting means.

15. In a flow control system, a conduit through which a fluid is adapted to flow, an instrument to measure the flow through said conduit, means to force said fluid through said conduit, means operated by said measuring means to control the supply of fluid through said forcing means, and means to automatically adjust said control means in response to ambient temperature and pressure conditions of the supply of fluid to said fluid forcing means.

16. In a control instrument comprising means to measure a physical property of the flow of air through a conduit which flow of air is to be measured and controlled at a constant weight per unit time, means operated by said measuring means to control the amount of said air flowing to some predetermined point, means to adjust said control means comprising a shiftable member and means to vary the length of said member in response to atmospheric temperature and atmospheric pressure conditions.

17. In a measuring and control instrument the combination of means responsive to the weight of a fluid flowing through a conduit, means operated by said first means upon changes in the weight of said fluid to act to return said weight to a normal value, and mechanism responsive to variations in atmospheric temperature and atmospheric pressure adjacent the instrument to adjust the normal operation of said instrument to compensate for the temperature and pressure changes.

18. In an instrument for measuring and controlling the flow of a fluid, the combination with measuring means, control means actuated thereby, means to adjust the value at which the control means will tend to maintain the flow being controlled, and a temperature responsive element and a pressure responsive element forming part of said adjusting means whereby changes in temperature and pressure will alter the setting of said adjusting means.

19. A measuring and control instrument for controlling the flow of a fluid comprising, means to measure the flow of the fluid being measured and controlled, means operated by said measuring means to control the flow of said fluid at some predetermined point, means to adjust said control means comprising a shiftable member and means to vary the length of said member in response to changes in atmospheric temperature and pressure conditions.

20. In an instrument for measuring and controlling the flow of a fluid, the combination of means responsive to the variations in the volume of the measurable flowing fluid, air operated means to control the flow of the fluid, means arranged to adjust said control means in response to variations in said flow noted by said responsive means, and mechanism responsive to variations in atmospheric conditions to regulate said responsive means in accordance therewith.

LOUIS GESS.